United States Patent
Bentholm et al.

[15] 3,679,794

[45] July 25, 1972

[54] PROCESS FOR THE MANUFACTURE OF RAPIDLY DISINTEGRATING SOLID DOSAGE UNIT FORMS

[72] Inventors: Svend Asger Rud Bentholm, Nuland; Wilhelm Engelinus Koenen, Oss, both of Switzerland

[73] Assignee: Organon Inc., West-Orange, N.J.

[22] Filed: Sept. 17, 1971

[21] Appl. No.: 181,588

Related U.S. Application Data

[63] Continuation-in-part of Ser. No. 799,061, Feb. 13, 1969, abandoned.

[52] U.S. Cl. ............................ 424/148, 260/231, 260/232, 424/229, 424/230, 424/238, 424/243, 424/362
[51] Int. Cl. ............................................................ A61j 3/10
[58] Field of Search .................................................. 424/362

[56] References Cited

UNITED STATES PATENTS

| | | | |
|---|---|---|---|
| 2,851,453 | 9/1958 | Kennon et al. | 260/232 |
| 3,034,911 | 5/1962 | McKee et al. | 106/210 |
| 3,181,998 | 5/1965 | Kanig | 424/362 X |
| 3,266,992 | 8/1966 | de Jong | 424/362 X |
| 3,490,742 | 1/1970 | Nichols et al. | 424/361 X |

*Primary Examiner*—Shep K. Rose
*Attorney*—Hugo E. Weisberger

[57] ABSTRACT

A solid dosage unit tablet or pill which is stable at high relative humidities and capable of disintegrating rapidly in the presence of moisture comprises an active ingredient, conventional tableting excipients and/or lubricants, and as a disintegrating agent from about 0.3 to about 3 percent by weight of an alkali metal salt of carboxymethylcellulose having a degree of polymerization between about 100 and about 2000, and a degree of substitution between 0.02 and 0.17 at polymerization degree 100, and between 0.02 and 0.57 at polymerization degree 2000.

4 Claims, 1 Drawing Figure

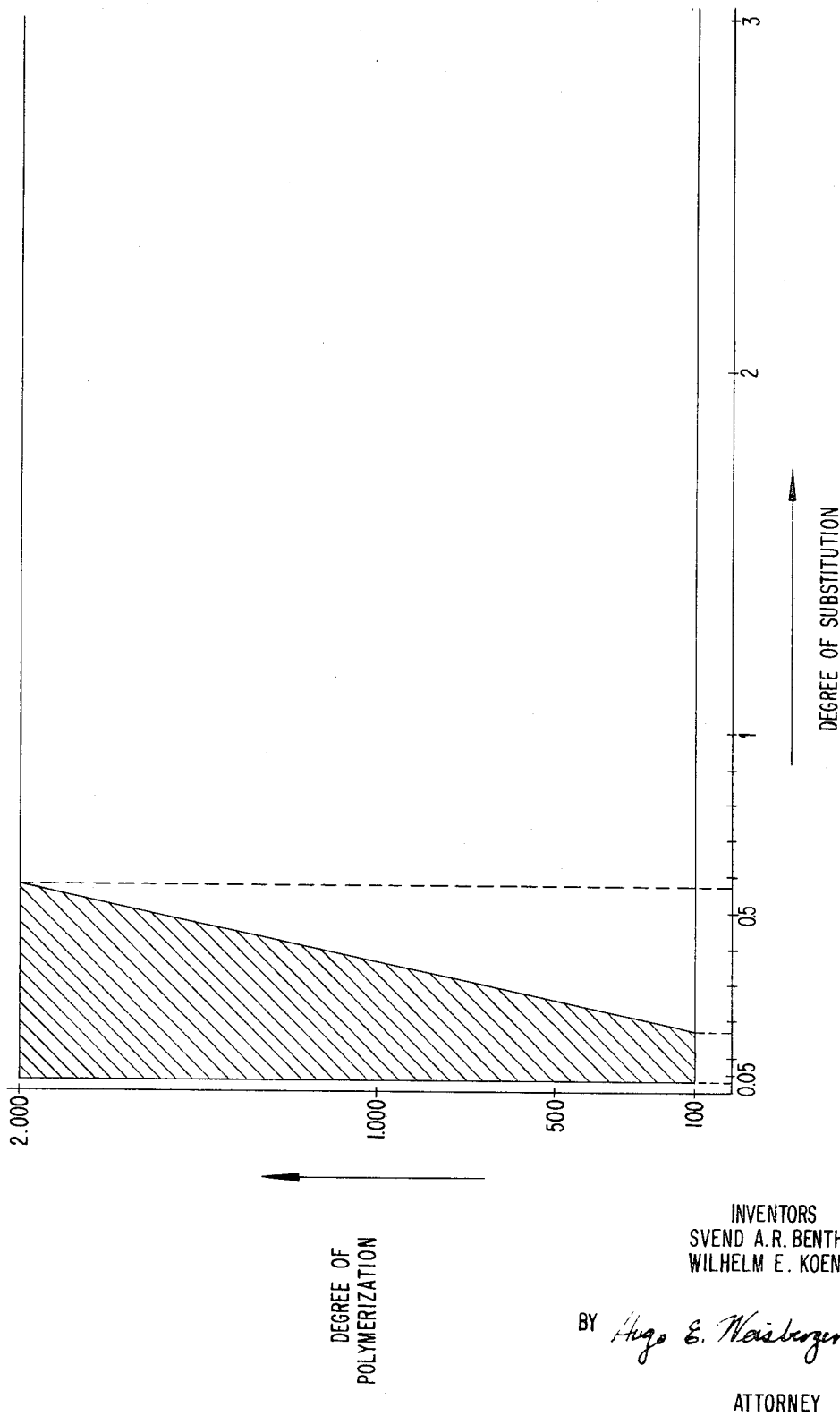

PROCESS FOR THE MANUFACTURE OF RAPIDLY DISINTEGRATING SOLID DOSAGE UNIT FORMS

CROSS-REFERENCE TO RELATED APPLICATION

This application is a continuation-in-part of application Ser. No. 799,061, filed Feb. 13, 1969 now abandoned.

BACKGROUND OF THE INVENTION

The invention relates to a process for the manufacture of very rapidly disintegrating solid dosage unit forms, such as tablets, or pills.

Solid pharmaceutical dosage unit forms, such as tablets, pills and the like, are one of the primary methods of administering drugs.

Tablets are prepared by compressing apportioned quantities of the active component, usually admixed with auxiliaries and fillers, at high pressure. Some of these powders can be compressed into well-coherent dosage unit forms of reasonable hardness without further treatment, but in many cases it is necessary first to add a binder to the powder, such as gelatin, carboxymethylcellulose, glucose, sucrose, or starch, after which the mixture is granulated and the granulate tabletted, if required, after the addition of a lubricant.

To ensure effectiveness of the drug it is essential that the tablet should readily disintegrate in aqueous medium, for example, in the stomach or in the intestinal canal, which is achieved by adding to the mass to be tabletted a suitable disintegrating agent, also called a swelling agent. This is especially essential when tablets have to be made containing a binding agent.

As disintegrating agents there are usually employed starch, modified starch and products obtained therefrom, such as amylopectin and amylose, gum tragacanth, cellulose, methylcellulose, agar-agar, bentonite, alginic acid, and the like. By adsorbing water such compounds will swell in consequence of which the tablet disintegrates. A disintegrating agent is preferably not readily water-soluble, as otherwise such an agent tends to form a viscous mass causing the formation of lumps, which does not indue but checks the disintegration of the tablet. Nevertheless disintegrating or swelling agents which are readily water-soluble, are sometimes used in practice, but to ensure a reasonable effect such compounds must be used in relatively large quantities.

The latter group also includes those carboxymethylcellulose salts which are entirely or substantially entirely water soluble.

Another drawback of a number of conventional disintegrating agents is that they have a high equilibrium moisture content, which means that they will adsorb water at a high relative humidity. In consequence thereof the disintegrating activity takes place prematurely and the tablets containing such swelling agents will, in the nature of things, keep for only a very short time in a moist medium.

GENERAL DESCRIPTION OF THE INVENTION

In accordance with the present invention, it has been found that a very rapidly disintegrating solid dosage unit form is obtained when there is incorporated therein as a disintegrating agent an alkali metal salt of carboxymethylcellulose (CMC) having a degree of polymerization between about 100 and about 2000, and having a degree of substitution between about 0.02 and about 0.17 at polymerization degree 100, and between about 0.02 and about 0.57 at polymerization degree 2000.

Reference is made to the accompanying drawing to show the foregoing relationship.

The alkali metal salts of carboxymethylcellulose employed according to the invention and having the degree of polymerization and corresponding degrees of substitution, as set forth above, are preferred in view of their high disintegrating capacity, the small quantities in which they are employed, and their easy admixability with other ingredients of the tablet or pill. When these disintegrating agents are admixed with an active ingredient, together with conventional tabletting excipient binders and/or lubricants, and compressed at high pressure, they yield tablets or pills which retain their hardness and stability when stored at high relative humidities, but nevertheless disintegrate rapidly in presence of moisture. The small amount of the disintegrating required leaves additional space in the dosage unit for greater amounts of active ingredient and other substances.

The term "alkali metal salt" as employed herein includes the sodium, potassium, and ammonium salts of the carboxymethylcellulose. The alkali metal salts of the carboxymethylcellulose having the polymerization and substitution degree characteristics set forth above, when employed as disintegrating agents in accordance with the invention are especially effective in very low concentrations, ranging from about 0.3 percent to about 3 percent by weight, preferably about 0.5 percent to about 2 percent. They are far superior to all other known disintegrating agents in the same range of concentration.

The terms "degree of polymerization" and "degree of substitution," as employed herein, will be more readily understood in view of the following explanation:

As is well known, cellulose is composed of a large number of coupled glucose radicals. If, for example, it contains 500 of these radicals, the relative cellulose product has a polymerization degree of 500. Each glucose radical in the cellulose molecule possesses three hydroxyl groups, namely, one primary hydroxyl and two secondary hydroxyl groups. The hydrogen atom of each of these groups may be substituted by the group $CH_2COOX$, in which X is an alkali metal. If this is the case, the substitution degree is three. If only 1 hydroxyl group is etherified by a carboxymethyl group, the substitution degree is one.

As each glucose radical in a cellulose molecule can be substituted in a different manner, and the cellulose molecules can also differ among themselves in their substitution degree, reference is made to the average substitution degree, which may consequently lie between zero and three. The usual commercial products have a substitution degree varying of from 0.6 to 1.0 at a polymerization degree of about 1000, such as the readily water-soluble carboxymethyl cellulose salts mentioned previously, which were applied as disintegrating agents prior to the present invention.

The salts of carboxymethylcellulose having the substitution and polymerization degrees and applied as disintegrating agents according to the preset invention have surprisingly favorable disintegration properties. Their swelling capacity is at least 10 to 20 times greater than that of the known disintegrating agents. Consequently, one of the most important advantages of the present disintegrating agents is that much smaller quantities of these agents can be incorporated in the tablet or other dosage form so that there is more space left for other substances, notably drugs. Furthermore, the disintegrating agents of the invention are not sticky and do not have the tendency to form mucus like the known gummy disintegrating agents.

Another surprising favorable property is that the alkali metal salts of the CMC according to the invention have a low equilibrium moisture content, in consequence of which tablets or pills prepared in this manner will retain their hardness and will keep practically forever. This appears from the following tables which give the moisture contents of three kinds of tablets, viz. one tablet (1) without disintegrating agents, one tablet (2) containing starch, and one tablet (3) containing a CMC derivative according to the invention (Na CMC—X), at a relative humidity of 65 percent and 80 percent respectively, after a period of storage of from five to 61 days.

TABLE 1

Composition of Tablets:

| Components (%) | Tablet 2 | Tablet 2 | Tablet 3 |
|---|---|---|---|
| Lactose | 99 | 79 | 97 |
| Calcium stearate | 1 | 1 | 1 |
| Starch | – | 20 | – |
| Na CMC-X | – | – | 2 |

TABLE 2

Moisture Content at 65% Relative Humidity

Period of storage (expressed in days)

| Tablet | 5 | 8 | 14 | 47 | 61 |
|---|---|---|---|---|---|
| 1 | 0.09 | 0.12 | 0.15 | 0.14 | 0.13 |
| 2 | 1.32 | 1.36 | 1.43 | 1.42 | 1.42 |
| 3 | 0.25 | 0.28 | 0.30 | 0.30 | 0.29 |

TABLE 3

Moisture Content at 80% Relative Humidity

Period of storage (expressed in days)

| Tablet | 18 | 60 |
|---|---|---|
| 1 | 0.24 | 0.27 |
| 2 | 2.25 | 2.30 |
| 3 | 0.46 | 0.47 |

It will be understood that the active ingredient in the dosage units of the present invention may include therapeutic agents, such as medicaments, drugs, antibiotics, and the like, as well as foods or nutrient agents, sweeteners, or pesticides, or detergents, bleaches, and others of a wide variety of substances, or mixtures thereof, adapted to be prepared in solid unit forms containing predetermined dosages or concentrations. Such solid unit forms may also include as an ingredient suitable effervescent agents, such as sodium bicarbonate-citric acid combinations. The content of active ingredient will depend upon its nature and usage.

In forming the tablets or pills, or the like dosage forms, there may be employed, within the contemplation of the invention, conventional tabletting excipient binders and lubricants, such as lactose, starch, talc, magnesium stearate, gelatin, and various gums, such as tragacanth, arabic, and the like.

It is known to employ the sodium salt of carboxymethylcellulose having a degree of substitution of 0.1 to 0.6 as a thickening agent to produce an edible spread having an unctuous consistency, and a procedure of this kind is disclosed in U.S. Pat. No. 3,418,133. However, a spread is not is not a solid product, and inasmuch as there is no similarity in function between a thickening agent and a disintegrating agent, it could not have predicted that the alkali metal salts of carboxymethylcellulose according to the present invention would provide excellent disintegrating properties when employed in solid dosage unit products.

In U.S. Pat. No. 2,851,453 it is proposed to employ as a tablet disintegrating agent a powdered acid carboxymethylcellulose derived from the corresponding sodium salt by replacing from about 40 percent to about 80–90 percent of the sodium by hydrogen, by means of ion exchange, the original sodium carboxymethylcellulose having a degree of substitution of from about 0.3 to about 1.2.

In Examples I and II of U.S. Pat. No. 2,851,453 there are set forth test data for an acid carboxymethylcellulose prepared from a sodium carboxymethylcellulose having a degree of substitution of 0.7, employed in various percentages as a disintegrating agent for sulfathiazole tablets prepared using 10 percent starch paste as a binder, and additional water, and compressing the ingredients at various compressional forces ranging from 500 to 8000 pounds per tablet, using various percentages of the disintegrating agent. The procedure of the patent is to mix powdered acid carboxymethylcellulose with sulfathiazole powder, adding 10 percent starch paste and water, then pushing the resulting moist mixture through a 10 mesh sieve, and drying the resulting granules at 45° C. for 2 hours. The dried granules are then pushed through a 20-mesh sieve and those retained on a 60 mesh sieve are used to make test tablets. In Table I, the patentees disclose a formulation using 1 percent of acid CMC, with 96 gm sulfathiazole, 30 gm 10 percent starch paste, and 14 cc additional water. A portion of 0.33 gm of granulate is compressed into a tablet, using compressional forces ranging from 500 to 8000 pounds per tablet. When the tablet is 2 days old, disintegrating times are determined according to U.S.P. XIV.

In order to determine the comparative effectiveness of the disintegrating agent of the patent and that of the present invention, tablets were prepared as described using the proportions in Table I, Example A, of the patent, employing 1 percent of each of two different sodium carboxymethylcellulose compounds: (1) polymerization degree 1500, substitution degree 0.23, and (2) polymerization degree 1500, substitution degree 0.38. The resulting tablets were made by compression at 2000, 3000, 5000 and 8000 pounds, respectively, and the disintegration times were tested as described in U.S.P. XVIII. The comparative results are as shown in the following table:

TABLE 1

| Compressional Force Lb./Tablet | Disintegration Time Per Tablet, Seconds | | |
|---|---|---|---|
| | U.S. Patent 2,851,458 Tablet A | Tablets of Present Invention | |
| | | (1) | (2) |
| 2000 | 1020  135 | | 45 |
| 3000 | 1586 | 230 | 130 |
| 5000 | 5660 | 860 | 540 |
| 8000 | 14,000 | 5,000 | 1,200 |

The foregoing data clearly demonstrate the greater disintegrating effectiveness of the disintegrating agents of the present invention at a low concentration, namely 1 percent by weight.

U.S. Pat. No. 3,034,911 discloses the preparation of milk sugar tablets containing as a disintegrant various cold water swelling starches or modified starches (dextrin, British gum, gelatinized starch), and exhibiting disintegrating times in water from 176 to 2200 seconds, cf. table, column 4., the tablets having an average hardness ranging from 5.9 to 14.6 kg/sq.cm., and the amount of disintegrant being 5 percent by weight. For comparison a tablet was prepared containing 97 percent of lactose, 2 percent amylopectin binder, and 1 percent of sodium carboxymethylcellulose having a polymerization degree 1500, and substitution degree 0.23, according to the invention, all percentages being by weight. The resulting tablet exhibited a hardness of 8.5 kg. and a disintegration time in water of only 30 seconds. Thus, only 1 percent of the disintegrating agent of the present invention was approximately five to 70 times as effective as five times the amount of the starches or modified starches of the patent.

DESCRIPTION OF THE PREFERRED EMBODIMENTS

In the following examples a number of compositions are given, in which CMC salts according to the invention have been incorporated as disintegrating agents. These examples are to be considered as illustrative of the practice of the invention, and not as limiting.

EXAMPLE I

A mixture of 500 gm of acetylsalicylic acid and 100 gm of lactose were granulated with a 2 percent amylopectin solution. The granulate was sieved and dried, then mixed with 14 gm of Na CMC (1100/0.35 = polymerization degree/substitution degree) and 50 gm of talc, and then compressed into tablets of 700 mg each.

In the same manner tablets were prepared in which KCMC (1500/0.18), Na CMC (600/0.13) and Na CMC (1100/0.24) were incorporated as disintegrating agents in quantities of 8 gm, 15 gm and 11 gm resrespectively.

EXAMPLE II

One gm of oestriol was granulated with 24 gm of lactose and 2 percent amylopectin solution. This granulate was mixed with 0.5 gm of Na CMC (1250/0.28) and 2 gm of magnesium stearate, and then compressed into tablets of 250 mg each.

In the same manner tablets were prepared in which NH₄CMC (1500/0.43), KCMC (500/0.06), Na CMC (500/0.21) and Na CMC (1100/0.18) were incorporated as disintegrating agents in quantities of 0.6 gm, 0.85 gm, 0.7 gm and 0.6 gm respectively.

EXAMPLE III

A mixture of 50 g of sodium bicarbonate and 50 gm of borax was granulated, sieved and dried, and then mixed with 2 gm of thymol and 2 gm of Na CMC (1400/0.38 and then tabletted.

Further KCMC (1100/0.09) was used instead of Na CMC in a quantity of 2.5 gm.

EXAMPLE IV

A mixture of 500 gm of sulphamethizol, 12 gm of Na CMC (1100/0.35) and 150 gm of gelatin was dried, granulated and sieved, and then mixed with 30 gm of magnesium stearate/talc (1:9) and compressed into tablets of 650 mg each.

Rapidly disintegrating tablets were also obtained by replacing Na CMC (1100/0.35) by 14 gm of Na CMC (1100/0.11) or 10 gm of KCMC (500/0.18) respectively.

EXAMPLE V

A granulate of 5 gm of cortisone-21-acetate, 1.75 gm of KCMC (800/0.28), 65 gm of lactose and 15 gm of gelatin were sieved, dried and sieved again, and then mixed with 6 gm of talc, after which the mass was compressed into tablets of 40 mg each.

What is claimed is:

1. A solid dosage unit compressed tablet or pill, capable of retaining hardness and stability when stored at high relative humidity and capable of rapid disintegration in the presence of moisture, comprising an active ingredient, a conventional excipient binder, and as the essential disintegrating agent an effective amount of from about 0.3 percent to about 3 percent by weight of an alkali metal salt of carboxymethylcellulose having a degree of polymerization between about 100 and about 2000, and a degree of substitution between about 0.02 and about 0.17 at a degree of polymerization of 100, and between about 0.02 and about 0.57 at a degree of polymerization of 2000, said disintegrating agent having greater swelling capacity and disintegrating effectiveness at low concentrations than a corresponding low concentration of an acidic partial alkali metal salt of a carboxymethylcellulose having a degree of substitution of about 0.7.

2. The dosage unit of claim 1 in which the proportion of said alkali metal salt of carboxymethylcellulose disintegrating agent is between about 0.5 percent and about 2 percent by weight.

3. The dosage unit of claim 1 in which said active ingredient is a medicament.

4. The dosage unit of claim 1 in which said active ingredient is a nutrient.

* * * * *